United States Patent [19]

De Keyser et al.

[11] 3,930,930

[45] Jan. 6, 1976

[54] APPARATUS FOR MANUFACTURING A LAMINATE BY MEANS OF A SOLVENTLESS ADHESIVE

[75] Inventors: Rudiger De Keyser, Rillaar; André Depuydt, Teper, both of Belgium

[73] Assignee: U.C.B. Societe Anonyme, Brussels, Belgium

[22] Filed: June 13, 1974

[21] Appl. No.: 479,677

Related U.S. Application Data

[62] Division of Ser. No. 209,148, Dec. 17, 1971, Pat. No. 3,840,419.

[30] Foreign Application Priority Data

Dec. 21, 1970 United Kingdom............... 60585/70

[52] U.S. Cl. ......... 156/578; 118/246; 118/DIG. 15; 156/324; 427/429; 428/336
[51] Int. Cl.².... B05C 1/08; B32B 31/12; C09J 5/00
[58] Field of Search............ 117/66, 111 H, DIG. 1; 118/DIG. 15, 246, 262; 156/229, 309, 324, 547, 549, 555, 578; 161/165; 427/429; 428/336; 68/202

[56] References Cited
UNITED STATES PATENTS

| | | | |
|---|---|---|---|
| 2,089,524 | 8/1937 | Abrams et al. ................ | 117/111 H |
| 2,333,629 | 11/1943 | Beadle ........................... | 117/111 H |
| 2,882,179 | 4/1959 | Blackford ....................... | 117/47 A |
| 3,023,128 | 2/1962 | Affelder........................ | 117/111 H |
| 3,647,525 | 3/1972 | Dahlgren ....................... | 117/111 H |
| 3,661,626 | 5/1972 | Wosaba .......................... | 117/111 H |

*Primary Examiner*—Douglas J. Drummond
*Assistant Examiner*—Robert A. Dawson
*Attorney, Agent, or Firm*—Wenderoth, Lind & Ponack

[57] ABSTRACT

An apparatus for manufacturing a laminate having a width of at least 30 cm. by means of a solventless adhesive, wherein, in a first stage, means are provided for continuously supplying a solventless adhesive to a distributor means comprising a pre-dosing element and an elastic-surfaced rotating element in such a manner as to coat the surface of the elastic-surfaced rotating element with a layer of solventless adhesive having a thickness of from 5 to 50 microns, the layer then being substantially transferred to a moving film to be laminated, the circumferential speed of the elastic-surfaced rotating element and the speed of linear displacement of the film being in a ratio of from 1:10 to 1:50, so that the film receives a layer of solventless adhesive of a thickness of from 0.5 to 5 microns, and, in a second stage, means are provided for bonding in a known manner the film coated in this manner to another film to form a laminate.

10 Claims, 6 Drawing Figures

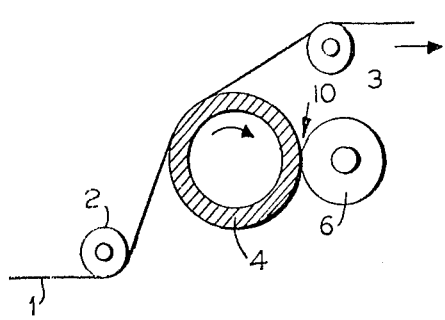
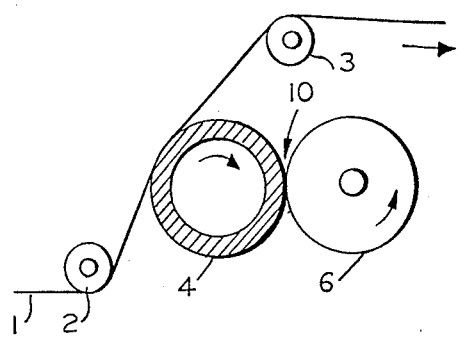
FIG.2　　　　　　FIG.3
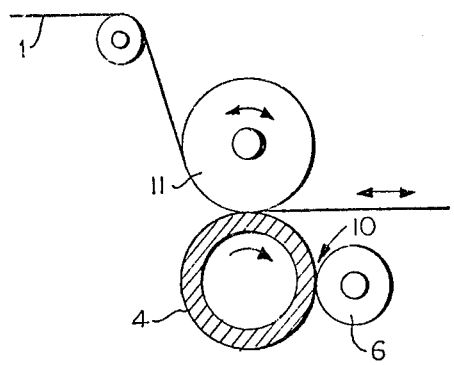
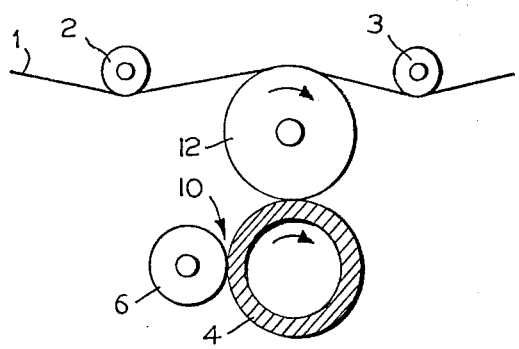
FIG.4　　　　　　FIG.5
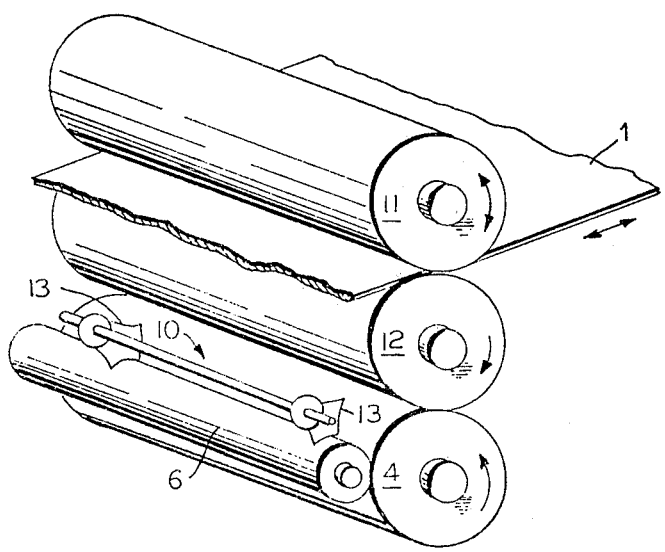
FIG.6

APPARATUS FOR MANUFACTURING A LAMINATE BY MEANS OF A SOLVENTLESS ADHESIVE

The present application is a division of copending application Ser. No. 209,148, filed Dec. 17, 1971, now U.S. Pat. No. 3,840,419.

BACKGROUND OF THE INVENTION

The present invention is concerned with the manufacture of a composite packing material by means of a solventless adhesive and, more particularly, is concerned with the manufacture of a material containing at least one film of plastics material.

In the present invention, there is to be understood by composite, or more simply "laminated," packing material, the material obtained by bonding together at least one film, preferably of plastics material, and at least one film of any other material, which may be plastics material, metal, paper, fabric or the like.

By solventless adhesive, there is understood an adhesive the use of which for a bonding operation does not entail the evaporation of volatile materials. This excludes, in particular, water-based glues, glues in the form of a dispersion, solution or emulsion and also glues constituted by a natural or synthetic resin dissolved or emulsified in at least one volatile organic solvent. A typical representative of a solventless adhesive which is preferably used according to the present invention is that known as a two (or multi-) reactive component adhesive, the two (or more) components of which react together in situ to form a cross-linked adhesive polymer. Examples of this kind of adhesive include a hydroxylated polyester or polyether which is reacted with a di- or polyisocyanate and an expoxy resin which is reacted with compounds containing at least two active hydrogen atoms. It is to be understood that any solventless adhesive as defined above may be used for carrying out the present invention and that the nature of this adhesive is not limited in any way to the examples given above solely by way of illustration.

At present, laminates of the kind defined above are manufactured exclusively with solvent type adhesives; since these contain, as bonding agent, a high molecular weight polymer which has already been formed, the initial bond is sufficient to produce a firm joint between the films bonded together. Furthermore, the solvent makes it possible to adjust, as desired, the viscosity best suited to the application of the adhesive to the film and also to adjust the weight of adhesive applied per unit of area to values which are as low as desired. Nevertheless, this technique suffers from numerous disadvantages. First, for obvious reasons of hygiene, it is necessary to provide special, very expensive installations to prevent the poisoning of operators by the solvent vapors and to avoid all risk of fire. In addition, the use of a solvent for the preparation of the adhesive entails various stages of operation, such as dissolving the adhesive in the solvent, intimate mixing of the components and, finally, the elimination of the solvent, preferably in an oven, before bonding the laminate, which entails great expenditure of time and cost of equipment. In these operations, either the solvent is lost, which represents a dry loss of raw material, or else it is recovered as far as possible but this also requires expensive installations. Another disadvantage is that the active life of the adhesive in its ready for use form is limited, this life being inversely proportional to the reactivity of its components. If the machine manufacturing the laminates should stop, the adhesive still remaining in the coating vessels is lost, because its period of reactivity or "pan life" is too limited.

It would be much more advantageous to use solventless adhesives, because the disadvantages inherent in the use of solvents would be eliminated. Nevertheless, it has not hitherto been found possible to use solventless adhesives in the manufacture of laminates for the following reasons: the initial adhesive power of a solventless adhesive is very low because the polymerization (polyaddition) of its components does not start until the moment when the adhesive is applied to the sheet of laminate to be manufactured and, consequently, adhesivity, which is a corollary of polymerization (polyaddition), is acquired only after a certain time, which may vary from a few minutes to several hours. This low initial molecular weight of the solventless adhesive is, nevertheless, necessary in order to prevent the system from acquiring excessive viscosity which would prevent the application of the adhesive to the laminate sheet at ambient temperature or at higher temperature. This low viscosity is all the more necessary because, in the manufacture of laminates, an extremely thin layer of adhesive is applied, generally with a thickness of from 0.5 – 5 microns.

It will be readily appreciated that it is extremely difficult to spread a layer of adhesive at a rate of 0.5 to 5 grams per square meter (a thickness of 0.5 to 5 microns) uniformly on a sheet of plastics material. It is a solution of this problem, which hitherto has constituted an obstacle to the use of a solventless adhesive in the manufacture of laminates, which constitutes the object of the present invention.

There is already known a system for the application of a solventless adhesive to a sheet of plastics material (see British patent specification No. 1,158,740) but the method and apparatus described in this patent specification do not permit the manufacture of laminates. This patent specification contemplates, in particular, the application of a strip of adhesive to a sheet of plastics material for the purpose of manufacturing bags. This is clear from the accompanying drawing, in which a stereotype cylinder 5 applying adhesive to a sheet of plastics material has the dimensions required for forming a narrow adhesive strip. It would obviously be possible to conceive this cylinder 5 as having a suitable width for applying the adhesive over the entire width of a sheet of plastics material, for example with a width of 1.20 meter but this would implicitly entail a corresponding increase of the dimensions of the two-cylinder system (counter-cylinder 2 and applicator cylinder 1) used for feeding the adhesive to the sterotype cylinder 5. Although this patent specification does not specify this, the counter-cylinder 2 and the applicator cylinder 1 are necessarily of metal because each of them contains an internal heating system 14 and 15 and, consequently, they must be good conductors of heat. In order to be able to apply such small amounts of adhesive of 0.5 – 5 grams per square meter, preferably 1 to 2.5 grams per square meters, it would be necessary to bring the counter-cylinder 2 so close to the feeder cylinder 1 that seizing would become inevitable because of the large dimensions which they would need to have. This is all the more so because, according to this patent specification, all these cylinders have different circumferential speeds, the ratio of circumferential speeds between the applicator cylinder 1 and the counter-cylinder 2 being from 1.1 to 5, preferably, from 1.5 to 1.7, and the ratio of the circumferential speeds between the stereotype cylinder and the applicator cylinder being from 1 to 3.5. These different circumferential speeds, which constitute an essential characteristic of this patent specification, have the object of producing shearing forces effecting intimate mixing of the old adhesive, which is still contained on each of the cylinders, with the fresh adhesive supplied, in order to avoid the formation of "cobwebs." For the purpose of lamination, it is necessary to prevent old adhesive, the degree of condensation of which has already reached too advanced a stage, from remaining on the rollers, as this would entail difficulties in the uniform transmission of the complete layer of adhesive to the sheet to be coated and would cause the sheet of plastics material to stick to the stereotype roller. Precisely the fact that the apparatus of this patent specification necessarily contains a stereotype cylinder has the consequence that there will always be a mixture of fresh adhesive and old adhesive, because the depressions in the stereotype roller become progressively filled with hardened adhesive, which, after a certain period of operation, causes a film of plastics material to stick to the stereotype cylinder.

SUMMARY OF THE INVENTION

Contrarily to the foregoing, according to the present invention, it is possible to remove substantially all the adhesive fed to the adhesive applicator system and to transfer it entirely to the sheet to be coated; in other words, the problem of the formation of "cobwebs" is eliminated because substantially no mixture of old adhesive with fresh adhesive is formed.

According to the present invention, there is provided an apparatus for the manufacture of a laminate having a width of at least 30 cm. by means of a solventless adhesive, preferably a laminate composed of at least one film of plastics material, the apparatus comprising a first stage wherein a solventless adhesive is fed continuously to a distributor means comprising a pre-dosing element and an elastic-surfaced rotating element, for example a metal cylinder provided with a covering of synthetic or natural rubber, in such a manner as to coat the surface of the elastic-surfaced rotating element with a layer of solventless adhesive having a thickness of from 5 to 50 microns, preferably of from 10 to 25 microns, the layer then being substantially transferred to a moving film to be laminated, the circumferential speed of the elastic-surfaced rotating element and the speed of linear displacement of the film of plastics material being in the ratio of 1:10 to 1:50, preferably of 1:10 to 1:15, so that the film receives a layer of solvent-less adhesive with a thickness of from 0.5 to 5 microns, preferably of from 1 to 2.5 microns, and a second stage, wherein the film thus coated is bonded in known manner to another film in order to form a laminate.

The continuous intimate mixing of the components of the solventless adhesive is effected in a distribution head of known type, which does not form part of the present invention. The distribution head supplies the adhesive to the apparatus of the present invention between the predosing element and the elastic-surfaced rotating element. Depending on the width of the band of plastics material to be coated, one or more distribution heads distributed over the entire width of the pre-dosing element may be provided or else a single oscillating distribution head which periodically deposits adhesive over the entire width of the pre-dosing element. In order to prevent the adhesive from overflowing laterally beyond the pre-dosing element and the elastic-surfaced rotating element, lateral baffles are provided, which are adjustable in the width direction depending upon the width of the layer of adhesive to be applied.

The pre-dosing element of the distributor means according to the present invention is made of a rigid material, preferably of metal. It may be fixed or rotatable. When it is fixed, it may consist in a doctor bar, a fixed cylinder, or a similar device. When it is rotatable, it comprises a cylinder, the rotational speed of which is different from the rotational speed of the elastic-surfaced rotating element described hereinbelow. Whether it is fixed or rotatable, the pre-dosing element bears against the elastic-surfaced rotating element in such a manner as to form a layer of adhesive with a thickness of from 5 to 50 microns on the surface of the rotating element.

The elastic-surfaced rotating element comprises a metal cylinder, the surface of which is provided with a covering of natural of synthetic rubber capable of withstanding the possibly corrosive action of the solventless adhesive used. The thickness of the elastic layer should be sufficient to ensure flexible contact with the predosing element.

The layer of solventless adhesive present on the elastic-surfaced rotating element may be transferred indirectly or directly to the film.

When the layer of solventless adhesive disposed on the elastic-surfaced rotating element is transferred indirectly to the film to be coated, it is transferred with the aid of an intermediate rotating cylinder made of a smooth-surfaced rigid material, for example metal, interposed between the elastic-surfaced rotating element and the film to be coated, its circumferential speed being at least ten times greater than that of the elastic-surfaced rotating element. Because of this great difference in speed, the intermediate element completely removes the adhesive from the surface of the elastic-surfaced rotating element. Similarly, the film to be coated, which comes into contact with the intermediate element, has a speed of displacement equal to or slightly greater than the circumferential speed of the intermediate rotating cylinder so as to remove all the adhesive disposed on the surface of the latter. A counter-cylinder, preferably having an elastic surface, may be provided in order to improve the contact between the sheet of plastics material and the intermediate rotating cylinder.

When the layer of solventless adhesive disposed on the elastic-surfaced rotating element is transferred directly to the film to be coated, the latter may simply be stretched over the rotating element in the manner of a belt or else it may be pressed against the rotating element by means of a counter-cylinder, preferably provided with an elastic surface, in the manner indicated in the preceding paragraph.

In the case of indirect transfer of the adhesive, the counter-cylinders will having a circumferential speed equal to or preferably slightly greater than that of the intermediate rotating cylinder.

On the other hand, in the case of direct adhesive transfer, the circumferential speed of the counter-cylinder and that of the elastic-surfaced rotating element will be in a ratio of at least 10:1 to 50:1 and preferably of from 10:1 to 15:1.

The film which has been coated with the solventless adhesive in the manner according to the present invention then passes into the second part of the apparatus, in which it is bonded in known manner to the second film component of the laminate, for example by passing the two films between an elastic-surfaced cylinder and a rigid cylinder, for example of metal. This metal cylinder may optionally be provided with heating means.

If it is required to produce laminates composed of more than two films, this operation may be carried out either by a plurality of passes through the apparatus according to the present invention, adding one more film each time, or by providing a plurality of systems according to the present invention, disposed in series. Thus, the manufacture of laminates composed of more than two films may be carried out either by passing a laminate, instead of a film, into the first part of the apparatus or by supplying a laminate, instead of a film, in the bonding part of the apparatus, or else by using these two methods simultaneously; of course, these laminates may or may not have been manufactured according to the present invention.

To summarise, whatever the embodiment of the present invention adopted, it is of prime importance, for good operation of the apparatus and for obtaining a laminate of good quality, that the adhesive should be removed substantially completely from each cylinder and be transferred completely to the sheet of plastics material, so that it will not be able, in the course of time, to form a hardened coating on the surface of these cylinders. For this purpose, it is necessary that the ratio between the circumferential speed of the elastic-surfaced rotating element and the speed of linear displacement of the sheet of plastics material to be coated should be at least 1:10 (in the case of direct transfer) or that this same ratio of at least 1:10 should be maintained between the circumferential speed of the elastic-surfaced rotating element and the speed of the intermediate rotating cylinder which transfers the adhesive to the sheet to be coated, the latter having, in this case, a speed of displacement equal to or slightly greater than that of the intermediate rotating cylinder (in the case of indirect transfer).

BRIEF DESCRIPTION OF THE DRAWINGS

For a better understanding of the present invention, several embodiments thereof will now be described in more detail with reference to the accompanying drawings, in which:

FIG. 2 is an embodiment showing a fixed pre-dosing element;

FIG. 3 is another form of construction in which the pre-dosing element is rotatable;

FIG. 4 is a variant of FIG. 2, in which a counter-cylinder is provided;

FIG. 5 is another variant of FIG. 2, in which a smooth-surfaced intermediate cylinder is disposed between the elastic-surfaced rotating element and the the film to be coated; and FIG. 6 shows, in perspective, a variant of the apparatus illustrated in FIG. 5, containing a counter-cylinder and laterally adjustable lateral baffles.

DETAILED DESCRIPTION OF THE INVENTION

Figure 1:
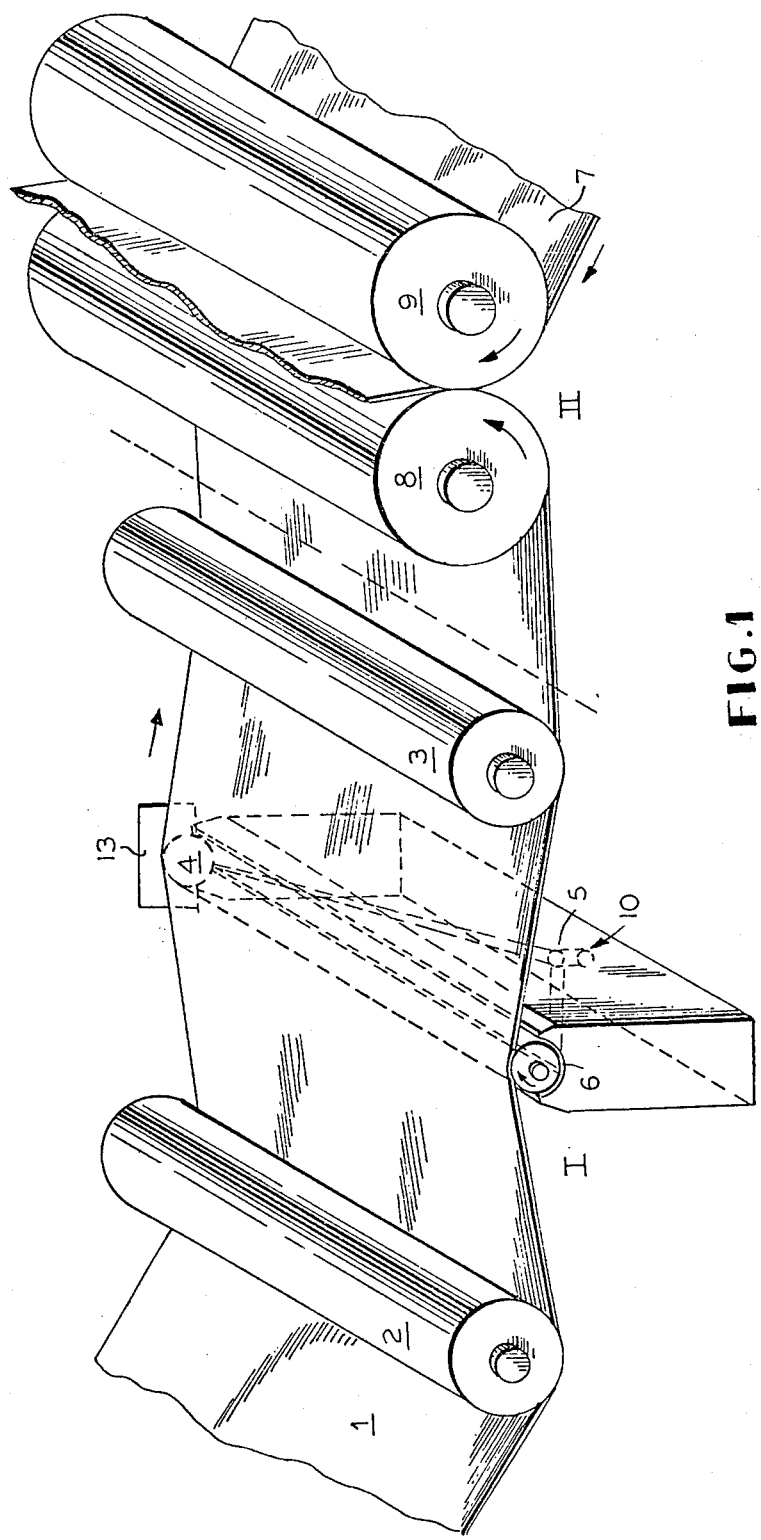
FIG. 1 illustrates diagrammatically an apparatus in accordance with the present invention.

Referring now to FIG. 1, I designates the coating zone and II the bonding zone. In zone I, a sheet of plastics material 1 is guided by means of a cylinder 2 and a cylinder 3 in such a manner that it bears against an elastic-surfaced rotating element 4. A solvent-less adhesive is fed (arrow 10) through a duct 5 discharging over the entire width of a pre-dosing element 6, the spacing of which, in relation to the elastic-surfaced rotating element 4, is such that it deposits on the latter a layer of adhesive with a thickness of from 5 to 50 microns and preferably of from 10 to 25 microns. The speed of displacement of the film 1 and the circumferential speed of the elastic-surfaced rotating element 4 are in a ratio of at least 10:1. The sheet of plastics material coated in this manner with a coating of adhesive with a thickness of 0.5 to 5 microns and preferably of from 1 to 2.5 microns (about 0.5 to 5 grams per square meter and preferably 1 to 2.5 grams per square meter of solventless adhesive) passes beyond the guide cylinder 3 into the bonding zone II, in which the sheet 1 is bonded in known manner to a sheet 7 by passing between cylinders 8 and 9.

In FIG. 2, the pre-dosing element comprises a fixed cylinder 6, which may be replaced by a fixed doctor blade. Adhesive is fed at the point marked by an arrow 10 symbolizing the distribution head which distributes the adhesive over the entire width of the elastic-surfaced rotating element.

In FIG. 3, the pre-dosing element 6 comprises a rotating cylinder having a preferably metallic smooth surface, the peripheral speed of which is different from that of the elastic-surfaced rotating element 4.

FIG. 4 is similar to FIG. 2, except that a counter-cylinder 11 is provided which presses the sheet of plastics material against the elastic-surfaced rotating element 4. The arrows show that the sheet of plastics material can move in the same direction as or in the opposite direction to that of the elastic-surfaced rotating element 4, the ratio between the respective speeds of the sheet and of the elastic-surfaced rotating element being here equal to at least 10:1.

In FIG. 5, there is illustrated an arrangement in which a rotating cylinder 12 is interposed between the elastic-surfaced rotating element 4 and the sheet of plastics material 1. The ratio between the peripheral speed of the element 4 and the peripheral speed of the element 12 is at least 1:10, while the speed of displacement of the sheet 1 in relation to the speed of the rotating cylinder 12 is equal or slightly higher.

FIG. 6 shows lateral baffles 13 provided to prevent the adhesive from overflowing from the pre-dosing element 6 and from the elastic-surfaced rotating element 4. In addition, a counter-cylinder 11 is provided, as illustrated in FIG. 4.

It is to be understood that the specific embodiments described and illustrated have only been given by way of example and do not in any way limit the scope of the present invention.

We claim:

1. An apparatus for manufacturing a laminate having a width of at least 30 cm. by means of a solventless adhesive, said apparatus comprising:
    an adhesive distributor means including a predosing element and an elastic-surfaced rotating element adjacent said predosing element;
    means for rotating said elastic-surfaced rotating element;
    means for continuously supplying solventless adhesive at a predetermined rate to said distributor means between said elastic-surfaced rotating element and said predosing element, and for applying all of said solventless adhesive from said predosing element to said elastic-surfaced rotating element in a layer having a thickness of from 5 to 50 microns;

means for moving with respect to said elastic-surfaced rotating element a first film at a linear speed of from 10 to 50 times the circumferential speed of said elastic-surfaced rotating element, and for transferring all of said layer of solventless adhesive from said elastic-surfaced rotating element to said first film in a coating having a thickness of from 0.5 to 5 microns; and means for bonding said thus coated first film to a second film to form a laminate.

2. An apparatus as claimed in claim 1, wherein said predosing element is fixed.

3. An apparatus as claimed in claim 1, wherein said predosing element is made of metal.

4. An apparatus as claimed in claim 1, wherein said predosing element is rotatably mounted and is provided with drive means.

5. An apparatus as claimed in claim 1, further comprising an intermediate rotatable cylinder of smooth-surfaced rigid material interposed between said elastic-surfaced rotating element and the path of the film to be coated, drive means for rotating said intermediate rotating cylinder, said means for rotating the elastic-surfaced rotating element and the drive means of the intermediate rotating cylinder being so adjustable that their circumferential speeds will be in a ratio of from 1:10 to 1:50.

6. An apparatus as claimed in claim 1, further comprising an intermediate rotatable cylinder of smooth-surfaced rigid material interposed between said elastic-surfaced rotating element and the path of the film to be coated, drive means for rotating said intermediate rotating cylinder, said means for rotating the elastic-surfaced element and the drive means of the intermediate rotating cylinder being so adjustable that their circumferential speeds will be in a ratio of from 1:10 to 1:50; and wherein said means for moving said first film is so adjustable that the speed of displacement of said first film will be equal to the circumferential speed of the intermediate rotating cylinder.

7. An apparatus as claimed in claim 1, further comprising an intermediate rotatable cylinder of smooth-surfaced rigid material interposed between said elastic-surfaced rotating element and the path of the film to be coated, drive means for rotating said intermediate rotating cylinder, said means for rotating the elastic-surfaced rotating element and the drive means of the intermediate rotating cylinder being so adjustable that their circumferential speeds will be in a ratio of from 1:10 to 1:50; and wherein said means for moving said first film is so adjustable that the speed of displacement of the film will be higher than the circumferential speed of the intermediate rotating cylinder.

8. An apparatus as claimed in claim 1, wherein said elastic-surfaced rotating element is a metal cylinder, the surface of which is provided with a covering of natural or synthetic rubber.

9. An apparatus as claimed in claim 1, further comprising a counter-cylinder adapted to press said first film against said elastic-surfaced rotating element.

10. An apparatus as claimed in claim 1, further comprising a counter-cylinder adapted to press said first film against said elastic-surfaced rotating element, said counter-cylinder being provided with an elastic surface.

* * * * *